United States Patent [19]
Giebel et al.

[11] Patent Number: 5,727,101
[45] Date of Patent: Mar. 10, 1998

[54] MONOLITHIC FERRULE FOR RECEIVING AND POSITIONING MULTIPLE OPTICAL FIBERS AND AN OPTICAL FIBER CONNECTOR INCORPORATING SAME

[75] Inventors: Markus A. Giebel, Conover; James P. Luther, Hickory, both of N.C.

[73] Assignee: Siecor Corporation, Hickory, N.C.

[21] Appl. No.: 540,288

[22] Filed: Oct. 6, 1995

[51] Int. Cl.[6] .................................................. G02B 6/38
[52] U.S. Cl. .................................................. 385/59
[58] Field of Search ........................... 385/60–68, 72, 385/78–85

[56] References Cited

U.S. PATENT DOCUMENTS

| | | | |
|---|---|---|---|
| 3,846,010 | 11/1974 | Love et al. | 385/55 |
| 4,405,200 | 9/1983 | Hoffmann et al. | 385/59 |
| 4,685,765 | 8/1987 | Daly et al. | 385/70 |
| 4,699,458 | 10/1987 | Ohtsuki et al. | 385/59 |
| 4,708,433 | 11/1987 | Kakii et al. | 385/59 |
| 4,763,978 | 8/1988 | Courtney-Pratt et al. | 385/54 |
| 4,898,449 | 2/1990 | Vroomen et al. | 385/114 |
| 4,978,377 | 12/1990 | Brehm et al. | 385/87 |
| 4,989,946 | 2/1991 | Williams et al. | 385/16 |
| 5,064,268 | 11/1991 | Morency et al. | 385/126 |
| 5,093,881 | 3/1992 | Bortolin et al. | 385/56 |
| 5,123,072 | 6/1992 | Kawanami et al. | 385/64 |
| 5,125,055 | 6/1992 | Kawanami et al. | 385/59 |
| 5,157,749 | 10/1992 | Briggs et al. | 385/60 |
| 5,214,730 | 5/1993 | Nagasawa et al. | 385/58 |
| 5,257,333 | 10/1993 | Nodfelt | 385/58 |
| 5,353,365 | 10/1994 | Dumas et al. | 385/51 |
| 5,384,875 | 1/1995 | Shannon et al. | 385/102 |

FOREIGN PATENT DOCUMENTS

| | | | |
|---|---|---|---|
| 62-19821 | 1/1987 | Japan | 385/59 |
| 62-247308 | 10/1987 | Japan | 385/59 |
| 1-120511 | 5/1989 | Japan | 385/59 |
| 2-55312 | 2/1990 | Japan | 385/59 |

*Primary Examiner*—John Ngo

[57] ABSTRACT

An optical fiber connector includes a connector housing and a monolithic ferrule disposed within the connector housing for maintaining a plurality of optical fibers in respective predetermined positions relative to the connector housing. The monolithic ferrule includes a monolithic ferrule body defining an internal cavity and a plurality of longitudinal bores through which the optical fibers extend. The optical fiber connector can also include an annular alignment key extending radially outward from the monolithic ferrule and having a position indicator adapted to mate with the connector housing such that the monolithic ferrule is held in a predetermined position relative to the connector housing. Accordingly, the optical fibers secured within the monolithic ferrule can be held in respective predetermined positions relative to the connector housing. The alignment key can be formed from the same piece of material from which the monolithic ferrule body is formed such that the alignment key is an integral part of the monolithic ferrule. The monolithic ferrule can also include ferrule alignment means for aligning the monolithic ferrule with another ferrule such that the optical fibers received by the longitudinal bores defined by the monolithic ferrule are aligned with the optical fibers secured within the other ferrule, thereby increasing the efficiency with which optical signals are transmitted therebetween.

18 Claims, 2 Drawing Sheets

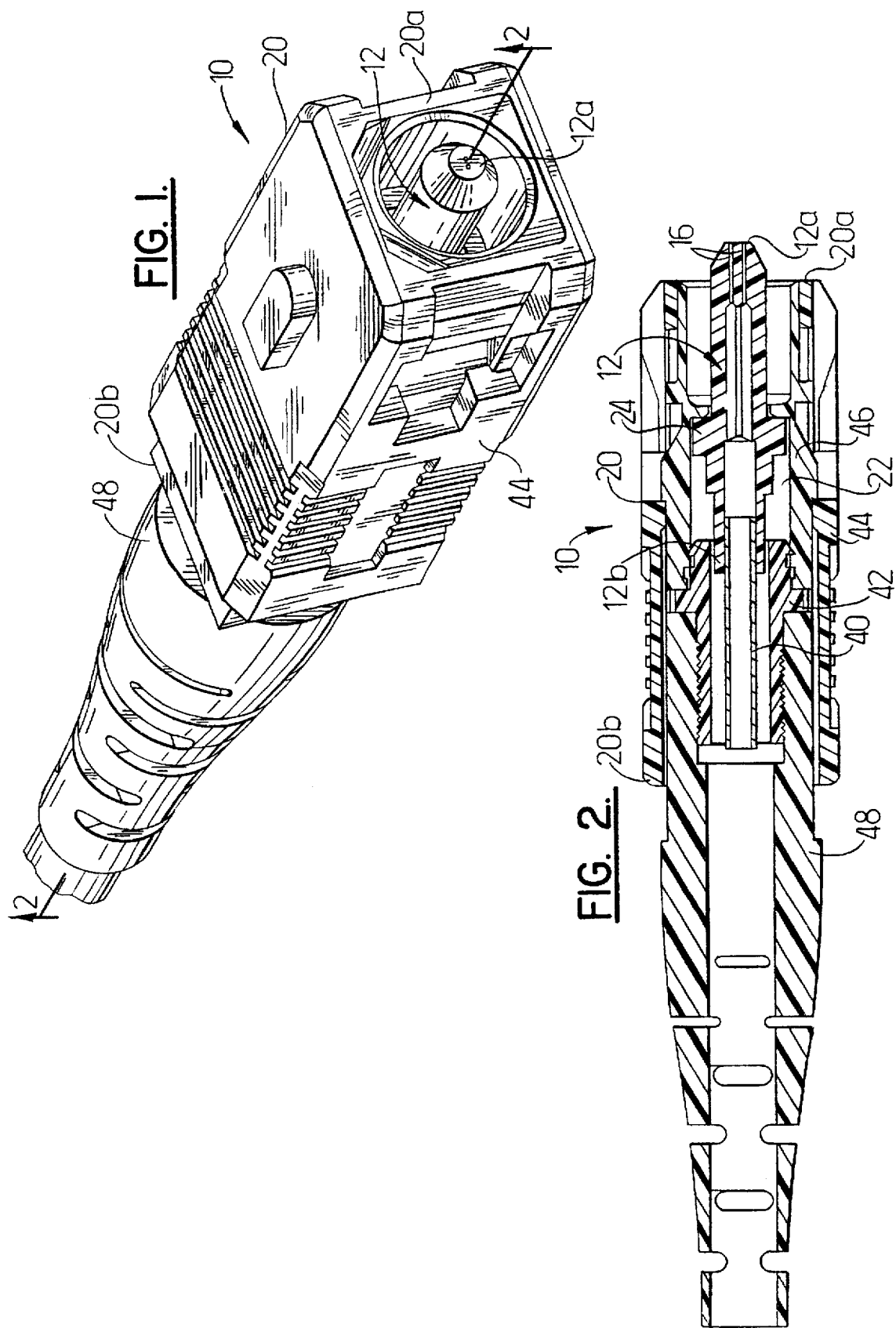

MONOLITHIC FERRULE FOR RECEIVING AND POSITIONING MULTIPLE OPTICAL FIBERS AND AN OPTICAL FIBER CONNECTOR INCORPORATING SAME

FIELD OF THE INVENTION

The present invention relates generally to ferrules and associated optical fiber connectors and, more particularly, to ferrules and associated optical fiber connectors which receive and position multiple optical fibers.

BACKGROUND OF THE INVENTION

Optical fibers are widely used in a variety of applications, including the telecommunications industry in which optical fibers are employed in a number of telephony and data transmission applications. Due, at least in part, to the extremely wide bandwidth and the low noise operation provided by optical fibers, the use of optical fibers and the variety of applications in which optical fibers are utilized are continuing to increase. For example, optical fibers no longer serve merely as the medium for long distance signal transmissions, but are increasingly routed directly to the home or, in some instances, directly to a desk or other work location.

In order to effectively route and install optical fibers, efficient methods of coupling optical fibers, such as to other optical fibers, to a patch panel in a telephone central office or in an office building or to various remote terminals or pedestals, are required. Accordingly, a variety of optical fiber connectors have been developed which can be mounted to end portions of one or more optical fibers to facilitate connection or coupling of the optical fibers.

In order to further facilitate the connection of one or more optical fibers, a number of standard optical fiber connectors have been developed. These standard optical fiber connectors provide a predetermined type of connector interface such that the optical fiber connector or other type of terminal to which the standard optical fiber connector will be coupled can be appropriately designed to mate therewith. In particular, a number of different types of standard optical fiber connectors, such as the SC, FC, ST and D4 connectors, have been developed.

Each of these standard optical fiber connectors is designed to receive and maintain a single optical fiber in a predetermined position during interconnection, such as with another optical fiber connector or other types of terminals. In ever increasing numbers of applications, however, it is desirable to transmit and receive optical signals via two or more optical fibers. For example, it is desirable in many fiber to the desk applications to route a pair of optical fibers to the desk in order to concurrently send and receive optical signals.

In order to provide two or more optical fibers for these and other applications, a number of optical fiber connectors have been developed which receive and maintain two or more optical fibers in respective predetermined positions during interconnection. For example, the ESCON™ connector and the FCS™ connector have been developed. These connectors include a pair of conventional ferrules, each of which receive and maintain a single optical fiber in a predetermined position during interconnection. The ESCON™ and FCS™ connectors also include a housing or yoke which surrounds and supports the ferrules in a side-by-side relationship. Accordingly, these optical fiber connectors can provide for the simultaneous connection of two or more optical fibers as known to those skilled in the art. However, these optical fiber connectors, such as the ESCON™ and FCS™ connectors, are generally relatively large since they include at least two conventional ferrules positioned in a side-by-side relationship.

In addition, several other types of customized or non-standard optical fiber connectors have been developed to receive and maintain two or more optical fibers in predetermined positions during interconnection. For example, U.S. Pat. No. 5,064,268 to Roger L. Morency, et al. discloses a fiber optic connector plug which provides for the connection of a plurality of optical fibers in high pressure environments. In particular, the fiber optic connector of the Morency '268 patent defines an internal cavity in which a number of components for aligning and positioning the optical fibers are disposed. These components include a precision insert which defines a number of axial passages through which the optical fibers are inserted. The internal cavity of the fiber optic connector plug of the Morency '268 patent is also filled with several different types of encapsulating resins in order to properly position and seal the optical fibers within the fiber optic connector plug.

U.S. Pat. No. 4,898,449 to Laurentius C. J. Vroomen, et al. also discloses a multi-component optical fiber connector which receives and positions a plurality of optical fibers. The optical fiber connector of the Vroomen '449 patent includes a fiber holder which is inserted in the front end of the optical fiber connector to maintain the optical fibers in the proper positions. In addition, the rear portion of the optical fiber connector of the Vroomen '449 patent is filled with a molding mass of a suitable synthetic resin.

Other nonstandard, multi-component optical fiber connectors for interconnecting a plurality of optical fibers are described in U.S. Pat. Nos. 5,125,055 and 5,123,072 to Norihide Kawanami, et al. The optical fiber connectors of the Kawanami '055 and '072 patents include a sleeve in which a plurality of lengthwise extending pins are disposed. The pins are generally circular in lateral cross-section so as to define a number of lengthwise extending passageways therebetween. Accordingly, a plurality of optical fibers can extend through respective ones of the lengthwise extending passageways and can be maintained in predetermined positions during interconnection with other optical fibers or other types of terminals.

U.S. Pat. No. 5,093,881 to Bruno Bortolin, et al. discloses another type of multi-component optical fiber connector. In particular, the optical fiber connector of the Bortolin '888 patent includes a ferrule formed by a pair of complimentary ferrule elements. Each ferrule element defines a recess in which an optical fiber ribbon cable can be disposed. Each ferrule element also defines a number of grooves through which the individual optical fibers of the ribbon cable can extend. The ferrule elements of the Bortolin '881 patent are adapted to mate in a predetermined aligned relationship such that the respective recesses and grooves are aligned. Accordingly, a plurality of optical fibers can be simultaneously connected by the optical fiber connector of the Bortolin '881 patent. However, the optical fiber connector of the Bortolin '881 patent does require a pair of complimentary ferrule elements as described above, each of which includes a recess and a number of precisely formed grooves for receiving and aligning the optical fibers.

Finally, U.S. Pat. No. 5,214,730 to Shinji Nagasawa, et al. describes an optical fiber connector for receiving and positioning a plurality of optical fibers such that the optical fibers can be simultaneously connected. The optical fiber connector of the Nagasawa '730 patent includes a number of lengthwise extending, laterally spaced apart passageways through which respective ones of the optical fibers extend. In addition, the optical fiber connector of the Nagasawa '730 patent includes a pair of guide pins for engaging respective apertures defined in the front face of another optical fiber connector such that the pair of optical fiber connectors can be maintained in a predetermined aligned relationship.

The optical fiber connector of the Nagasawa '730 patent is generally rectangular in lateral cross-section, thereby potentially limiting the number of applications in which the optical fiber connector can be effectively utilized since, in some instances, an optical fiber connector having a generally circular shape in lateral cross-section is required in order to appropriately mate with another optical fiber connector or other type of terminal. In addition, the optical fiber connector of the Nagasawa '730 patent is typically formed of a thermosetting material which solidifies upon heating, thereby requiring relatively sophisticated fabrication processes in order to solidify the thermosetting material into the predetermined shape of the optical fiber connector.

Therefore, while a number of customized or nonstandard optical fiber connectors have been developed to receive and maintain a number of optical fibers in position during interconnection, these optical fiber connectors typically include multiple components, such as multiple ferrules, which must be assembled to form the optical fiber connector. Due to the multiple components which must generally be precisely aligned, the assembly process can be relatively complicated and the resulting cost of the nonstandard optical fiber connectors can be correspondingly increased. In addition, due to the customized or nonstandard designs of these optical fiber connectors, the optical fiber connectors typically cannot mate with standard optical fiber connectors or with terminals which have been designed to mate with standard optical fiber connectors. Further, the relatively large size of a number of the nonstandard optical fiber connectors described above limits the applications in which such optical fiber connectors can be employed since they may be unable to mate with other optical fiber connectors or other types of terminals in areas of limited access.

SUMMARY OF THE INVENTION

It is therefore an object of the present invention to provide an improved optical fiber connector for simultaneously connecting a plurality of optical fibers.

It is another object of the present invention to provide an improved ferrule for receiving and maintaining a plurality of optical fibers in respective predetermined positions prior to and during interconnection.

It is a further object of the present invention to provide a monolithic ferrule for receiving and maintaining a plurality of optical fibers in respective predetermined positions relative to the connector housing of a standard optical fiber connector.

These and other objects are provided, according to the present invention, by an optical fiber connector including a connector housing and a monolithic ferrule disposed within the connector housing which maintains a plurality of optical fibers in respective predetermined positions relative to the connector housing. The connector housing defines an internal cavity opening through the first and second ends of the connector housing in which the monolithic ferrule is disposed. According to one advantageous embodiment, the connector housing has a size and shape which matches the predetermined size and shape of the connector housing of a standard optical fiber connector, such as an SC, FC, ST or D4 optical fiber connector. Accordingly, the optical fiber connector of this embodiment of the present invention can be effectively coupled to other standard optical fiber connectors or other types of terminals adapted to mate with standard optical fiber connectors.

The monolithic ferrule of the present invention includes a monolithic ferrule body, typically formed of a thermoplastic or ceramic material, which extends longitudinally between opposed first and second ends and which defines an internal cavity for receiving the plurality of optical fibers. The internal cavity opens through both the second end of the monolithic ferrule body and extends longitudinally through at least a portion of the monolithic ferrule body. The monolithic ferrule body also defines a number of longitudinal bores extending between the first end of the monolithic ferrule body and the internal cavity defined therein. The longitudinal bores are adapted to receive respective ones of the plurality of optical fibers such that the optical fibers are maintained in respective predetermined positions relative to the monolithic ferrule body.

The first end of the monolithic ferrule body is preferably exposed through the first end of the connector housing. Thus, the optical fibers maintained within the longitudinal bores of the monolithic ferrule body can also be exposed through the first end of the connector housing so as to facilitate connection of the optical fibers, such as with other optical fibers.

The internal cavity can include first and second internal cavity portions adjacent the first and second ends of the monolithic ferrule body, respectively. In order to facilitate the insertion of the plurality of optical fibers within the internal cavity defined by the monolithic ferrule body, the size of the second internal cavity portion adjacent the second end of the monolithic ferrule body is preferably greater than the size of the first internal cavity portion. The second internal cavity portion can also include a radially tapered portion adjacent the second end of the monolithic ferrule body to further facilitate the insertion of the plurality of optical fibers therein.

The monolithic ferrule body of one embodiment in the present invention also includes a radially tapered nose portion adjacent the first end of the monolithic ferrule body. The radially tapered nose portion has an outer diameter which decreases in a longitudinal direction toward the first end of the monolithic ferrule body. Accordingly, the connection of an optical fiber connector which includes the monolithic ferrule body of this embodiment is simplified since the radially tapered nose portion serves to guide the monolithic ferrule body into proper alignment with the ferrule of the optical fiber connector with which connection is being made and, more particularly, with the optical fibers of the optical fiber connector with which connection is being made.

An optical fiber connector of one advantageous embodiment of the present invention also includes an annular alignment key mounted to the monolithic ferrule and extending radially outward. The alignment key includes a position indicator and is adapted to mate with the connector housing such that the monolithic ferrule is held in a predetermined position therein. Accordingly, the plurality of optical fibers received by the longitudinal bores defined by the monolithic ferrule are maintained in respective predetermined positions relative to the connector housing since the plurality of longitudinal bores are positioned in a predetermined angular relationship to the position indicator of the alignment key and, consequently, to the connector housing. According to one embodiment, the monolithic ferrule includes the annular alignment key such that the alignment key is an integral portion of the monolithic ferrule body and is formed of the same material from which the monolithic ferrule body is formed.

The monolithic ferrule can also include ferrule alignment means for aligning the monolithic ferrule with another ferrule such that the optical fibers received by the longitudinal bores defined by the monolithic ferrule are aligned with the optical fibers secured within the other ferrule. According to one embodiment, the ferrule alignment means includes interlocking means for rotatably engaging both aligned ferrules and a ferrule sleeve. The ferrule sleeve has opposed first and second ends and can be mounted about both the first end of the monolithic ferrule body and an end portion of the other ferrule body. Accordingly, the ferrule bodies are rotatably engaged by the ferrule sleeve in the predetermined aligned relationship.

According to one embodiment, the ferrule alignment means and, more specifically, the interlocking means includes a slot defined by the monolithic ferrule body and extending both radially inward and longitudinally along the exterior surface thereof. The slot is adapted to receive a rib which extends longitudinally along and radially into a bore defined by the ferrule sleeve. Thus, the monolithic ferrule body can be rotatably engaged in a predetermined position relative to the ferrule sleeve and, in turn, to the other ferrule rotatably engaged by the ferrule sleeve.

Accordingly, the monolithic ferrule of the present invention is simplified since the monolithic ferrule is formed from a single piece of material and, consequently, is not comprised of multiple components which must be separately fabricated and then assembled in a predetermined aligned relationship. Correspondingly, the assembly of the optical fiber connector is also simplified since the monolithic ferrule is formed from a single piece of material. Further, the monolithic ferrule of the present invention is sized and shaped so that the monolithic ferrule can be disposed within a connector housing of an optical fiber connector which has a standard size, thereby allowing multiple optical fibers to be connected by a single standard optical fiber connector of the present invention.

BRIEF DESCRIPTION OF THE DRAWINGS

FIG. 1 is a perspective view of one embodiment of an optical fiber connector of the present invention which includes a monolithic ferrule extending through a first end of the connector housing of the optical fiber connector.

FIG. 2 is a longitudinal cross-sectional view of the embodiment of the optical fiber connector of the present invention shown in FIG. 1 and taken along line 2—2.

DETAILED DESCRIPTION OF THE PREFERRED EMBODIMENT

The present invention will now be described more fully hereinafter with reference to the accompanying drawings, in which a preferred embodiment of the invention is shown. This invention may, however, be embodied in many different forms and should not be construed as limited to the embodiments set forth herein; rather, this embodiment is provided so that this disclosure will be thorough and complete and will fully convey the scope of the invention to those skilled in the art. Like numbers refer to like elements throughout.

Figure 3:
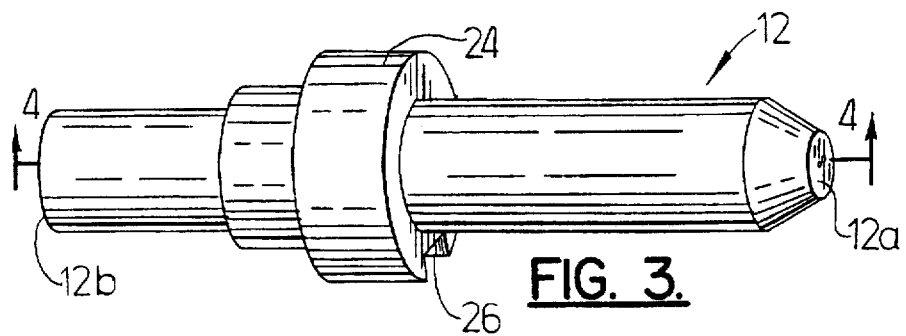
FIG. 3 is a perspective view of one embodiment of a monolithic ferrule according to the present invention.
Figure 4:
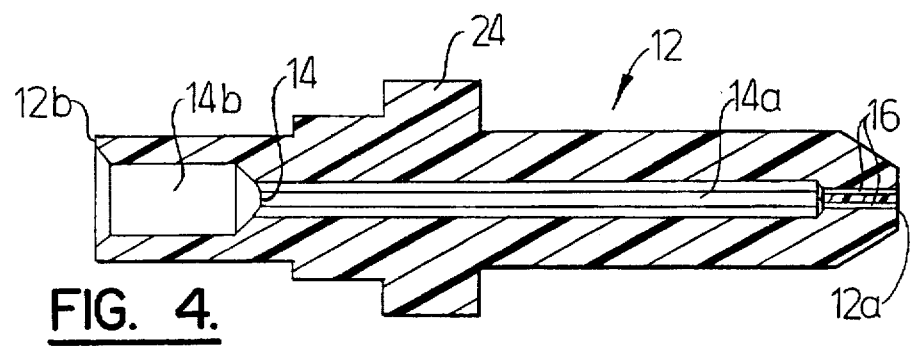
FIG. 4 is a longitudinal cross-sectional view of the embodiment of the monolithic ferrule of the present invention shown in FIG. 3 and taken along line 4—4 which illustrates the internal cavity and the plurality of longitudinal bores defined by the monolithic ferrule.

Referring now to FIG. 1, an optical fiber connector 10 according to one embodiment of the present invention is illustrated. The optical fiber connector includes a monolithic ferrule 12 for receiving and maintaining a plurality of optical fibers in respective predetermined positions. As shown in FIGS. 3 and 4, The monolithic ferrule includes a monolithic ferrule body extending longitudinally between first and second opposed ends 12a and 12b, respectively. The monolithic ferrule body also defines an internal cavity 14 for receiving the plurality of optical fibers. As shown in more detail in FIG. 4, the internal cavity opens through the second end of the monolithic ferrule body and extends longitudinally through at least a portion of the monolithic ferrule body.

In one advantageous embodiment, the internal cavity 14 defined by the monolithic ferrule body includes first and second internal cavity portions 14a and 14b adjacent the first and second ends of the monolithic ferrule body 12a and 12b, respectively. The first and second internal cavity portions have respective predetermined sizes and, more particularly, are preferably sized such that the second internal cavity portion is larger than the first internal cavity portion. Accordingly, the plurality of optical fibers can be readily inserted through the opening defined in the second end of the monolithic ferrule 12 and into the internal cavity defined therein.

The monolithic ferrule body of the present invention also defines a plurality of longitudinal bores 16 extending between the first end 12a of the monolithic ferrule body and the internal cavity 14 defined therein. The longitudinal bores are sized and shaped to receive respective ones of the plurality of optical fibers. Thus, the optical fibers are maintained within the longitudinal bores in respective predetermined positions relative to the monolithic ferrule body. For example, a monolithic ferrule body having a pair of longitudinal bores is shown in FIGS. 3 and 4 and is adapted to receive a pair of optical fibers. However, the monolithic ferrule body can include any number of longitudinal bores so as to receive any number of optical fibers without departing from the spirit and scope of the present invention.

Therefore, a plurality of optical fibers, typically arranged in an optical fiber cable, such as an optical fiber ribbon cable, can be inserted through the opening defined in the second end 12b of the monolithic ferrule body and into the internal cavity 14 defined therein, individual optical fibers can then be extended through respective ones of the longitudinal bores 16 defined by monolithic ferrule body and opening through the first end 12a thereof.

The monolithic ferrule 12 of the present invention is comprised of a single piece of material. For example, the monolithic ferrule can be formed of a thermoplastic material, such as a polyetherimidresin, the ULTEM® material available from General Electric Company or the RADEL® material available from Amoco Corporation. Alternatively, the monolithic ferrule can be formed of a ceramic material, such as a glass impregnated ceramic material.

In addition, the monolithic ferrule 12 can be formed in a variety of manners. For example, the monolithic ferrule can be molded, such as by an injection molding process, from a thermoplastic material. Alternatively, a block of material can be machined, such as by drilling and grinding, to form a monolithic ferrule of the desired shape. However, the monolithic ferrule can be formed by other methods known to those skilled in the art, without departing from the spirit and scope of the present invention.

As shown in FIGS. 1 and 2, the optical fiber connector 10 of the present invention also includes a connector housing 20 having opposed first and second ends 20a and 20b, respectively, and defining an internal cavity 22 opening through both ends thereof. The monolithic ferrule 12 of the present invention is preferably sized and shaped to be disposed within the internal cavity defined by the connector housing of an optical fiber connector having a standard size and shape, such as an SC connector, an FC connector, an ST connector or a D4 connector. In particular, the monolithic ferrule is preferably disposed within the internal cavity of the connector housing such that at least the first end 12a of the monolithic ferrule is exposed through the first end of the connector housing as best shown in FIGS. 1 and 2. As also illustrated, the plurality of optical fibers, such as a fiber optic cable, preferably extends into the internal cavity of the connector housing through the second end thereof.

The monolithic ferrule 12 of the present invention is preferably maintained in a predetermined position relative to the connector housing 20. Accordingly, the optical fiber connector 10 of one embodiment can include an annular alignment key 24 which is mounted in a fixed position to the monolithic ferrule. As illustrated, the annular alignment key extends radially outward from the monolithic ferrule and includes a position indicator 26 which is adapted to mate with the connector housing such that the monolithic ferrule is held in a predetermined position therein. In particular, as shown in FIG. 3, the position indicator can include a slot defined by the alignment key which is engaged by a corresponding element of the connector housing, such as a rib or other projection, such that the connector housing and the monolithic ferrule are effectively coupled.

As shown in FIGS. 3 and 4, the plurality of longitudinal bores 16 defined by the monolithic ferrule 12 are also positioned in a predetermined angular relationship to the position indicator 26 of the alignment key 24. Thus, the optical fibers received by longitudinal bores are maintained in respective predetermined positions relative to the position indicator of the alignment key and, in turn, to the connector housing 20.

Typically, an annular alignment key 24 is provided to prevent rotation of the monolithic ferrule 12 after the assembled optical fiber connector 10 has been installed in the field, such as to a coupling sleeve or other type of connector. As known to those skilled in the art, rotation of the optical fiber connector could damage the end face 12a of the monolithic ferrule. The annular alignment key also can provide an angular position indication for use in aligning the eccentricity of the fiber-ferrule assembly to maximize optical power transmission for a mated pair of optical fiber connectors. Such angular position indication can be established by optical detection during rotation. By preventing relative rotation of the monolithic ferrule and the connector housing 20 of the optical fiber connector, the annular alignment key also serves to maintain the predetermined alignment of the plurality of optical fibers with the other optical fibers to which the optical fiber connector is connected.

In one advantageous embodiment, the monolithic ferrule 12 also includes the annular alignment key 24 such that the alignment key is an integral portion of the monolithic ferrule body. Accordingly, the annular alignment key of this embodiment is formed of the same material from which the monolithic ferrule is comprised. However, the annular alignment key 24 can be formed as a separate component without departing from the spirit and scope of the present invention. For example, the alignment key can be press-fit on the monolithic ferrule or can be secured to the monolithic ferrule, such as with an epoxy.

In addition, while an optical fiber connector 10 having an annular alignment key 24 is illustrated and described herein, the optical fiber connector can include other means of coupling the connector housing 20 and the monolithic ferrule 12, including sizing the monolithic ferrule and the internal cavity 22 of the connector housing such that the monolithic ferrule and the connector housing are frictionally engaged, without departing from the spirit and scope of the present invention.

As shown in FIG. 2, the optical fiber connector 10 can also include a number of other components for securing the monolithic ferrule 12 within the connector housing 20 as known to those skilled in the art. For example, in the embodiment illustrated in FIGS. 1 and 2, the optical fiber connector can also include a lead in tube 40, typically comprised of a metallic material, which is disposed within the internal cavity 22 of the connector housing. A first end of the lead in tube is also preferably inserted through the opening defined in the second end 12b of the monolithic ferrule and into the second portion 22b of the internal cavity defined therein. The lead in tube further facilitates the insertion of the plurality of optical fibers into the monolithic ferrule of the present invention by directing the optical fibers longitudinally into the internal cavity of the monolithic ferrule.

The optical fiber connector 10 of this embodiment also includes a crimp body 42 which surrounds the lead in tube 40 and is mounted to the second end 12b of the monolithic ferrule 12. For example, the crimp body can be mounted in a press fit relationship to the second end of the monolithic ferrule or can be secured, such as with an epoxy, thereto. As illustrated, the optical fiber connector can also include a boot 48, typically comprised of a plastic material, which surrounds and, in some embodiments, threadably engages the crimp body so as to further protect the optical fiber cable. In particular, in embodiments in which the optical fiber connector of the present invention is adapted to mount to end portions of an optical fiber cable which includes one or more lengthwise extending strength members, such as aramid fibers, the strength members can be held securely between the crimp body and the boot in a manner which will protect the optical fiber connector assembly from subsequent axial forces (e.g., tension and torsion) to which the optical fiber cable is subjected. Although not illustrated, a crimp band, typically comprised of KEVLAR® material, can also be secured about the strength members of the optical fiber cable and the underlying crimp body in order to further protect the optical fiber connector assembly.

As also illustrated in FIG. 2, the connector housing 20 of this embodiment of the optical fiber connector 10 can be comprised of two components, namely, a coupler 44 and an inner housing 46. The coupler is typically comprised of a plastic material and defines an internal cavity extending longitudinally therethrough. The annular inner housing is also typically comprised of a plastic material and is disposed in a fixed position within the internal cavity defined by the coupler and, more particularly, in a fixed position adjacent the first end 20a of the connector housing 20. As illustrated, the inner housing is adapted to engage the annular alignment key 24 such that monolithic ferrule 12 is held in a predetermined position relative to the connector housing as described above.

The optical fiber connector 10 of the present invention can be connected to a variety of other optical fiber connectors, typically via a coupling sleeve, and other types of terminals in order to interconnect the plurality of optical fibers held by the monolithic ferrule 12 with other optical fibers, thereby enabling optical signals to be efficiently transmitted between the aligned optical fibers. Thus, in one advantageous embodiment, the monolithic ferrule 12 also includes ferrule alignment means for aligning the optical fibers received by the longitudinal bores 16 defined by the monolithic ferrule with the other optical fibers, such as the optical fibers secured within another ferrule.

In embodiments of the present invention in which the optical fiber connector 10 is mated with another optical fiber connector, the monolithic ferrule 12 can be one component of a ferrule assembly. In addition to the monolithic ferrule, the ferrule assembly of the present invention includes a coupling sleeve and, more particularly, a ferrule sleeve 30.

Figure 5:
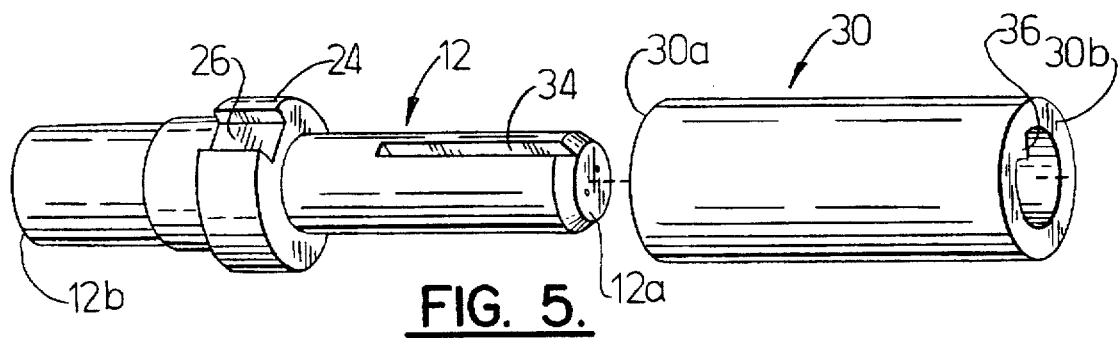
FIG. 5 is an exploded perspective view of one embodiment of a ferrule assembly of the present invention which includes a monolithic ferrule and a ferrule sleeve adapted to rotatably couple the monolithic ferrule with another ferrule in a predetermined aligned relationship.
Figure 6:
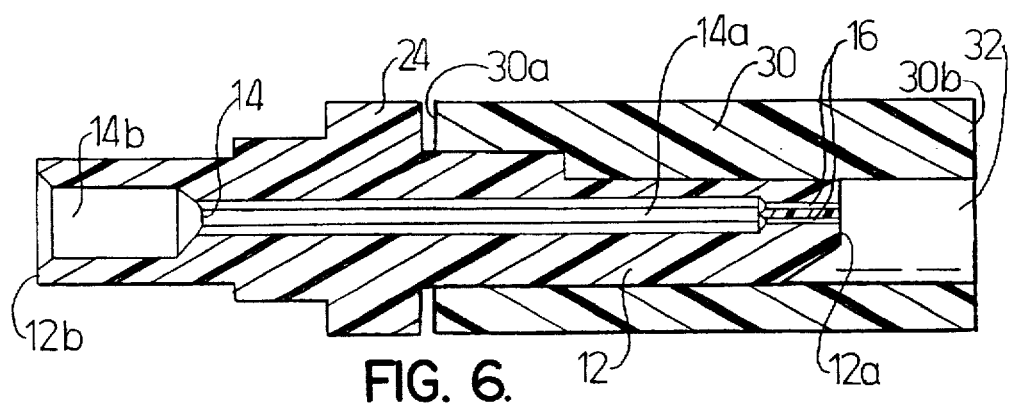
FIG. 6 is a lateral cross-sectional view of an assembled ferrule assembly including a monolithic ferrule and a ferrule sleeve which illustrates the interlocking relationship of the slot defined by the monolithic ferrule and the inwardly extending rib of the ferrule sleeve.

As shown in FIGS. 5 and 6, the ferrule sleeve 30 has opposed first and second ends 30a and 30b, respectively, and defines a bore 32 extending longitudinally therethrough and opening through both ends. More particularly, the bore defined by the ferrule sleeve is sized and shaped to receive a portion of the monolithic ferrule body and, more particularly, to receive the first end 12a of the monolithic ferrule body within the first end of the ferrule sleeve. In addition, the second end of the ferrule sleeve is capable of being mounted about an end portion of another ferrule such that both ferrules are held therein.

The ferrule alignment means of the monolithic ferrule 12 of this embodiment preferably includes interlocking means for rotatably engaging the ferrule sleeve 30 and the monolithic ferrule such that the rotatably engaged ferrule bodies are maintained in a predetermined aligned relationship. More specifically, the monolithic ferrule 12 and the other ferrule which are rotatably engaged by the ferrule sleeve are preferably maintained in a predetermined aligned relationship such that each of the optical fibers extending through the first end 12a of the monolithic ferrule are aligned with corresponding optical fibers secured within the other ferrule which is rotatably engaged by the ferrule sleeve. Consequently, optical signals can be efficiently transmitted between the corresponding optical fibers of the rotatably engaged ferrule bodies.

For example, the ferrule alignment means and, more particularly, the interlocking means can include a slot 34 defined by the monolithic ferrule body and extending both radially inward and longitudinally along the exterior surface thereof. According to this embodiment, the ferrule sleeve 30 also preferably includes a rib 36 extending longitudinally along and radially into the bore 32 defined by the ferrule sleeve 30. Accordingly, the rib of the ferrule sleeve can engage the corresponding slot defined by the monolithic ferrule body such that the monolithic ferrule body is rotat-ably coupled to the ferrule sleeve. The rib also preferably engages a slot defined by the other ferrule received by the ferrule sleeve such that both ferrules are rotatably coupled to the ferrule sleeve in the predetermined aligned relationship.

While a ferrule assembly having a monolithic ferrule 12 in which a slot 34 is defined and a ferrule sleeve 30 having a radially inwardly extending rib 36 is illustrated and described herein, the ferrule assembly can include other interlocking means for rotatably engaging the ferrule sleeve and the ferrule bodies without departing from the spirit and scope of the present invention. For example, the monolithic ferrule can include a rib extending both radially outward and longitudinally along the exterior surface thereof which is adapted to engage a corresponding slot defined longitudinally along the interior surface of the ferrule sleeve.

Accordingly, an optical fiber connector 10 including the monolithic ferrule 12 of the present invention can be connected, such as to another optical fiber connector and, more particularly, to another ferrule, by inserting end portions of the ferrules of both optical fiber connectors into opposed ends of the ferrule sleeve 30. As described above, the ferrule sleeve and the ferrule bodies are rotatably engaged by the interlocking means of the ferrule assembly in a predetermined aligned relationship such that the optical fibers held by each of the ferrules are appropriately aligned.

While a monolithic ferrule 12 having ferrule alignment means which includes interlocking means, such as a longitudinally extending slot 34, is described and illustrated herein, the ferrule alignment means can include a variety of other features for aligning the monolithic ferrule with another ferrule and, in turn, for aligning the optical fibers held by each of the respective ferrules. In addition, the ferrule alignment means can align the monolithic ferrule, such as with another ferrule, both in embodiments in which the monolithic ferrule is one component of a ferrule assembly as described above as well as in embodiments in which the monolithic ferrule is aligned with another ferrule without the assistance of a ferrule sleeve 30.

For example, the ferrule alignment means can include a plurality of apertures defined by the monolithic ferrule body and opening through the first end 12a thereof. The apertures defined by the monolithic ferrule body of this embodiment are adapted to receive respective ones of a plurality of guide pins such that the plurality of guide pins extend outwardly from the first end of the monolithic ferrule body. As known to those skilled in the art, the guide pins can be received and engaged by apertures defined by another ferrule body and opening through the first end thereof so as to rotatably engage the monolithic ferrule body and the other ferrule body. Accordingly, the ferrule bodies and, more particularly, the optical fibers received by the ferrule bodies, can be maintained in a predetermined aligned relationship without the assistance of a ferrule sleeve 30.

Accordingly, the fabrication and assembly of the monolithic ferrule 12 of the present invention can be simplified since the monolithic ferrule is formed from a single piece of material and, consequently, is not comprised of multiple components which must be separately fabricated and then assembled in a predetermined aligned relationship. Correspondingly, the fabrication and assembly of the optical fiber connector 10 of the present invention is also simplified since the monolithic ferrule is formed from a single piece of material. Further, the monolithic ferrule of the present invention is sized and shaped so that the monolithic ferrule can be disposed within a connector housing 20 of an optical fiber connector which has a standard size, thereby allowing That which is claimed is:

1. An optical fiber connector comprising:
   a connector housing having opposed first and second ends and defining an internal cavity opening through both the first and a monolith
   a monolithic ferrule for maintaining a plurality of optical fibers in respective predetermined positions relative to said connector housing, said monolithic ferrule comprising a monolithic ferrule body extending longitudinally between opposed first and second ends and disposed within the internal cavity of said connector housing such that the first end of said monolithic ferrule body is exposed through the first end of said connector housing, said monolithic ferrule body also defining an internal cavity for receiving the plurality of optical fibers, wherein the internal cavity opens through the second end of said monolithic ferrule body and extends longitudinally through at least a portion of said monolithic ferrule body, said monolithic ferrule body also defining a plurality of longitudinal bores extending between the first end of said monolithic ferrule body and the internal cavity defined therein, wherein the longitudinal bores are adapted to receive respective ones of the plurality of optical fibers such that the optical fibers are maintained in respective predetermined positions relative to the monolithic ferrule body; and
   an annular alignment key mounted to said monolithic ferrule and extending radially outward, wherein said alignment key includes a position indicator and is adapted to mate with said connector housing such that said monolithic ferrule is held in a predetermined position therein, and wherein the plurality of longitudinal bores are positioned in a predetermined angular relationship to the position indicator of said alignment key such that the optical fibers received by the longitudinal bores are maintained in respective predetermined positions to said connector housing.

2. An optical fiber connector according to claim 1 wherein said monolithic ferrule further comprises said annular alignment key such that said alignment key is an integral portion of said monolithic ferrule body.

3. An optical fiber connector according to claim 1 further comprising:
   a ferrule sleeve having opposed first and second ends and defining a bore extending longitudinally therethrough such that a first end of said ferrule sleeve is capable of being mounted about at least a portion of said monolithic ferrule and such that a second end of said ferrule sleeve is capable of being mounted about at least a portion of a ferrule of another optical fiber connector; and
   interlocking means for rotatably engaging said ferrule sleeve and the ferrule bodies about which said ferrule sleeve is mounted such that the rotatably engaged ferrule bodies are maintained in a predetermined aligned relationship.

4. An optical fiber connector according to claim 3 wherein said interlocking means comprises:
   a slot defined by said monolithic ferrule body and extending both radially inward and longitudinally along an exterior surface thereof; and
   a rib extending longitudinally along and radially into the bore defined by said ferrule sleeve to thereby engage a corresponding slot defined by each of the ferrule bodies such that the ferrule bodies are maintained by said ferrule sleeve in the predetermined aligned relationship.

5. An optical fiber connector according to claim 1 wherein the internal cavity defined by said monolithic ferrule body comprises first and second internal cavity portions adjacent the first and second ends of said monolithic ferrule body, respectively, and having respective predetermined sizes, and wherein the predetermined size of the second internal cavity portion is greater than the predetermined size of the first internal cavity portion to thereby facilitate the insertion of the plurality of optical fibers therein.

6. An optical fiber connector according to claim 1 wherein said monolithic ferrule body comprises a radially tapered nose portion adjacent the first end of said monolithic ferrule body, said radially tapered nose portion having an outer diameter which decreases in a longitudinal direction toward the first end of said monolithic ferrule body to thereby facilitate connection of the optical fiber connector.

7. A monolithic ferrule for maintaining a plurality of optical fibers in respective predetermined positions relative to an optical fiber connector, the monolithic ferrule comprising:
   a monolithic ferrule body extending longitudinally between opposed first and second ends, said monolithic ferrule body defining an internal cavity for receiving the plurality of optical fibers, wherein the internal cavity opens through the second end of said monolithic ferrule body and extends longitudinally through at least a portion of said monolithic ferrule body,
   said monolithic ferrule body also defining a plurality of longitudinal bores extending between the first end of said monolithic ferrule body and the internal cavity defined therein, wherein the longitudinal bores are adapted to receive respective ones of the plurality of optical fibers such that the optical fibers are maintained in respective predetermined positions relative to the monolithic ferrule body; and
   an integral alignment key extending radially outward, wherein said integral alignment key includes a position indicator and is adapted to mate with the optical fiber connector such that said monolithic ferrule is held in a predetermined position therein, wherein the plurality of longitudinal bores are positioned in a predetermined angular relationship to the position indicator of said integral alignment key such that the optical fiber received by the longitudinal bores are maintained in respective predetermined positions to the optical fiber connector.

8. A monolithic ferrule according to claim 7 further comprising ferrule alignment means for aligning the monolithic ferrule with another ferrule such that the optical fibers received by the longitudinal bores defined by the monolithic ferrule are aligned with the optical fibers secured within the other ferrule.

9. A monolithic ferrule according to claim 8 wherein said ferrule alignment means comprises a slot defined by said monolithic ferrule body and extending both radially inward and longitudinally along an exterior surface thereof, said slot being adapted to receive a rib extending longitudinally along and radially into a bore defined by a ferrule sleeve which is mounted about both the first end of said monolithic ferrule body and the other ferrule such that the ferrule bodies are rotatably engaged and thereby maintained by the ferrule sleeve in the predetermined aligned relationship.

10. A monolithic ferrule according to claim 7 wherein the internal cavity defined by said monolithic ferrule body comprises first and second internal cavity portions adjacent the first and second ends of said monolithic ferrule body, respectively, and having respective predetermined sizes, and wherein the predetermined size of the second internal cavity portion is greater than the predetermined size of the first internal cavity portion to thereby facilitate the insertion of the plurality of optical fibers therein.

11. A monolithic ferrule according to claim 10 wherein the second internal cavity portion defined by said monolithic ferrule body further comprises a radially tapered portion adjacent the second end of said monolithic ferrule body to further facilitate the insertion of the plurality of optical fibers therein.

12. A monolithic ferrule according to claim 7 wherein said monolithic ferrule body comprises a radially tapered nose portion adjacent the first end of said monolithic ferrule body, said radially tapered nose portion having an outer diameter which decreases in a longitudinal direction toward the first end of said monolithic ferrule body.

13. A monolithic ferrule according to claim 7 wherein said monolithic ferrule body is comprised of a material selected from the group consisting of thermoplastic material and ceramic material.

14. A ferrule assembly for maintaining a plurality of optical fibers in respective predetermined positions, the ferrule assembly comprising:

a monolithic ferrule body extending longitudinally between opposed first and second ends, said monolithic ferrule body defining an internal cavity for receiving the plurality of optical fibers, wherein the internal cavity opens through the second end of said monolithic ferrule body and extends longitudinally through at least a portion of said monolithic ferrule body, said monolithic ferrule body also defining a plurality of longitudinal bores extending between the first end of said monolithic ferrule body and the internal cavity defined therein, wherein the longitudinal bores are adapted to receive respective ones of the plurality of optical fibers such that the optical fibers are maintained in respective predetermined positions relative to the monolithic ferrule body;

a ferrule sleeve having opposed first and second ends and defining a bore extending longitudinally therethrough such that a first end of said ferrule sleeve is capable of being mounted about at least a portion of said monolithic ferrule body and such that a second end of said ferrule sleeve is capable of being mounted about at least a portion of another ferrule body; and interlocking means for rotatably engaging said ferrule sleeve and the ferrule bodies about which said ferrule sleeve is mounted such that the rotatably engaged ferrule bodies are maintained in a predetermined aligned relationship.

15. A ferrule assembly according to claim 14 wherein said interlocking means comprises:

a slot defined by said monolithic ferrule body and extending both radially inward and longitudinally along an exterior surface thereof; and a rib extending longitudinally along and radially into the bore defined by said ferrule sleeve to thereby engage a corresponding slot defined by each of the ferrule bodies such that the ferrule bodies are maintained by said ferrule sleeve in the predetermined aligned relationship.

16. A ferrule assembly according to claim 14 wherein said monolithic ferrule body further comprises an integral alignment key extending radially outward therefrom, said integral alignment key including a position indicator and being adapted to mate with the optical fiber connector such that said monolithic ferrule body is held in a predetermined position therein, and wherein the plurality of longitudinal bores are positioned in a predetermined angular relationship to the position indicator of said integral alignment key such that the optical fibers received by the longitudinal bores are maintained in respective predetermined positions to the optical fiber connector.

17. A ferrule assembly according to claim 14 wherein the internal cavity defined by said monolithic ferrule body comprises first and second internal cavity portions adjacent the first and second ends of said monolithic ferrule body, respectively, and having respective predetermined sizes, and wherein the predetermined size of the second internal cavity portion is greater than the predetermined size of the first internal cavity portion to thereby facilitate the insertion of the plurality of optical fibers therein.

18. A ferrule assembly according to claim 14 wherein said monolithic ferrule body comprises a radially tapered nose portion adjacent the first end of said monolithic ferrule body, said radially tapered nose portion having an outer diameter which decreases in a longitudinal direction toward the first end of said monolithic ferrule body.

* * * * *